Patented Jan. 19, 1932

1,841,965

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS

No Drawing. Application filed July 28, 1928, Serial No. 296,086, and in Germany July 21, 1926.

The present application is a continuation in part of our copending application for manufacture of vat dyestuffs Ser. No. 199,420, filed June 16, 1927, and relates to the production of vat dyestuffs which are considered to be ms-anthradianthrones.

We have found that new and particularly valuable vat dyestuffs are obtained by treating allo-ms-naphthodianthrones which may be obtained by subjecting a 2.2′-dimethyl-ms-benzdianthrone to the action of agents with an alkaline reaction, with condensing agents, such as acid condensing agents, for instance aluminium chlorid, and the like, or with alkaline agents such as caustic potash, under energetic conditions, such as high temperatures, with, if desired, an addition of an oxidizing agent, with or without the presence of solvents. It is probable that by the said treatment condensation is effected with additional ring formation according to the formulæ:

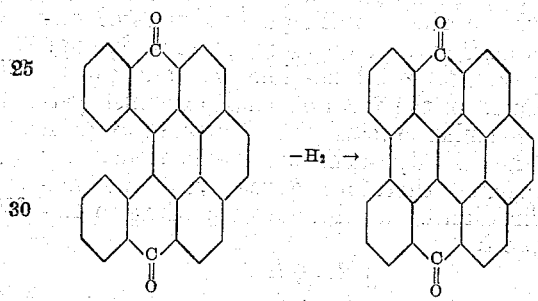

The new products may be termed ms-anthradianthrones. They generally dissolve in concentrated sulfuric acid to a violet to blue solution, and the bluish-violent vats give dyeings, on cotton, of similar shades which, when washed and soaped, change to a golden yellow extremely fast to light and chlorine.

The condensation with alkaline agents as referred to above has the special advantage that there is no need for the allo-ms-naphthodianthrone to be first prepared as such, but that the preparation of the allo-ms-naphthodianthrone from 2.2′-dimethyl-ms-benzdianthrone, as described in our copending application Ser. No. 199,420, can be combined with that of the ms-anthradianthrones, whereby the ms-anthradianthrones can be prepared direct, in one operation, from 2.2′-dimethyl-ms-benzdianthrone, by treatment with alkaline agents, a suitable method being by fusion with caustic alkalis. For example, 2.2′-dimethyl-ms-benzdianthrone is first treated with alcoholic caustic potash, under the conditions specified in Example 2 of the said application Ser. No. 199,420, the reaction temperature being raised to from about 250 to 280° C. after the alcohol has been distilled off. The 2.2′-dimethyl-ms-benzdianthrones may also be subjected directly to energetic treatment with alkaline agents, for example at from 250° to 280° C. thereby obtaining ms-anthradianthrones direct. The vat dyestuff obtained from the 2.2′-dimethyl-ms-benzdianthrone in both cases corresponds in its properties to the ms-anthradianthrone obtained by treating allo-ms-naphthodianthrone with acid condensing agents. Very good yields are obtained with the present process.

Halogenated ms-anthradianthrones are obtained by condensing halogenated allo-ms-naphthodianthrones which may be produced according to our copending application Ser. No. 296,085 in the before-described manner, or by subjecting an allo-ms-naphthodianthrone to treatment with halogen and simultaneous condensation, for example to treatment with halogen under pressure whereby hallogenation and condensation are effected simultaneously.

The following examples will further explain the nature of the invention which however is not restricted to these examples. The parts are by weight.

Example 1

1 part of allo-ms-naphthodianthrone obtainable according to Example 1 of our copending application Ser. No. 199,420 is thoroughly triturated with 20 parts of aluminium chlorid, and heated at 150° to 155° C. for 1½ hours and, after the addition of ice and dilute hydrochloric acid, is filtered by suction. The resulting dark brown powder may be purified by boiling it with dilute hypochlorite solution. It forms a light brown powder, which may be crystallized in small brown needles from nitrobenzene. The color of the solution in concentrated sulfuric acid is violet. Strong golden-yellow dyeings are obtained on cotton from a blue violet vat.

Example 2

1 part of the initial substance referred to in Example 1 is dissolved in 25 parts of trichlorbenzene and 10 parts of powdered aluminium chlorid are stirred in at from 140° to 145° C. After stirring for about 1½ hours, ice and dilute hydrochloric acid are added, and the solvent is expelled with steam. The resulting product is identical with the product obtained in Example 1.

Example 3

1 part of the condensation product obtainable from 4.4'-dichlor-2.2'-dimethyl-ms-benzdianthrone, according to Example 4 of our copending application Ser. No. 199,420, is mixed with 20 parts of aluminium chlorid and heated to from 145° to 150° C. for 1½ hours. The mass is treated as in Example 1. The resulting brown powder, dissolves to a violet solution in concentrated sulfuric acid, and gives yellow dyeings on cotton from a violet vat.

Example 4

A mixture of 1 part of dibrom-allo-ms-naphthodianthrone and 10 parts of aluminium chlorid is heated to form 160° to 165° C. until the color of the solution of a sample of the reaction product in concentrated sulfuric acid has become blue, which will occur in about 1½ to 2 hours. Dilute hydrohloric acid is then added, and the dyestuff is filtered by suction. According to analysis, the resulting brown powder is a dibrom-ms-anthradianthrone; it can be purified by treatment with hypochlorite or by crystallization from nitrobenzene. It furnishes strong orange-red dyeings on cotton from a bluish-violet vat.

Example 5

1 part of allo-ms-naphthodianthrone is heated with 3 parts of bromine to 100° C. for about 12 hours under pressure. The reaction product is dissolved in dilute caustic soda solution and filtered by suction. It consists of a brown powder, which dissolves to a greenish-blue solution in concentrated sulfuric acid, and gives strong orange-red dyeings on cotton from a bluish-violet vat.

Example 6

10 parts of allo-ms-naphthodianthrone are dissolved in 100 parts of chlorsulfonic acid, whereupon 3 parts of sulfur are added while stirring, followed by 4 parts of bromine. The mass is then heated to 65° to 70° C. and stirred at this temperature for 4 hours, whereupon it is diluted with 50 parts of concentrated sulfuric acid and poured onto ice. The resulting dibrom-ms-anthradianthrone is filtered off by suction. It dissolves with a blue coloration in concentrated sulfuric acid and dyes cotton from a bluish-violet vat orange shades of excellent fastness.

Example 7

10 parts of sulfuryl chlorid are stirred, drop by drop, at about 60° C. into a solution of 10 parts of allo-ms-napthodianthrone in 100 parts of nitrobenzene, 0.5 part of iodine having been previously added. Stirring is continued, at the same temperature, for further 6 hours, after which the temperature is raised to 160° C. and 0.5 part of iron filings or powder is added, followed by 10 parts of bromine. As soon as the evolution of halogen hydride has ceased, the treatment is continued as in the foregoing example, and the reaction product behaves in the same manner as that obtained in the said example.

Example 8

400 parts of allo-ms-naphthodianthrone are stirred into 2000 parts of caustic potash at from 220° to 225° C. The temperature is then raised to from 270° to 280° C., and stirring is continued until a sample of the reaction mixture dissolves to a blue-violet color in concentrated sulfuric acid, which occurs at the end of several hours. The melt is then cooled and taken up with hot water, the resulting dyestuff being completely thrown down by boiling or by an air blast, and then filtered by suction, washed until neutral and dried. The dyestuff, which represents an excellent yield and is in a very pure state, dissolves to a violet solution in concentrated sulfuric acid, gives strong golden yellow dyeings on cotton from a blue-violet vat, and can be obtained in the form of small brownish yellow acicular crystals from solvents of high boiling point, such as nitrobenzene. Its properties therefore agree with the ms-anthradianthrone obtained according to Example 1.

Example 9

400 parts of 2.2'-dimethyl-ms-benzdianthrone are stirred into a melt of 2000 parts of caustic potash and 2000 parts of alcohol, at from 115° to 120° C. The temperature is then raised to from 140° to 145° C. and stirring is continued at that temperature for several hours. After distilling off the alcohol, the temperature is raised to 280° C. and is maintained at that level until a sample of the reaction product gives a blue violet solution in concentrated sulfuric acid. The melt is then allowed to cool down a little and, after being taken up with hot water, is treated as described in the foregoing example. The resulting dyestuff is identical with that obtained according to Example 1. It can also be obtained by treating 2.2'-dimethyl-msbenzdianthrone direct with an alkali melt at 280° C.

What we claim is:

1. As new articles of manufacture, vat dyestuffs which are considered to be halogenated ms-anthradianthrones forming violet vats and dissolving to blue solutions in concentrated sulfuric acid.

2. As new articles of manufacture dibromms-anthradianthrone forming a bluish-violet vat and dissolving to blue solutions in concentrated sulfuric acid.

3. The process of producing new vat dyestuffs which comprises subjecting an allo-ms-naphthodianthrone to the action of a condensing agent.

4. The process of producing new vat dyestuffs which comprises subjecting an allo-ms-naphthodianthrone to the action of an acid condensing agent.

5. The process of producing new vat dyestuffs which comprises subjecting an allo-ms-naphthodianthrone to halogenation and simultaneous condensation.

In testimony whereof, we affix our signatures.

MAX ALBERT KUNZ.
KARL KÖBERLE.